United States Patent
Marler, III et al.

(10) Patent No.: US 9,565,925 B2
(45) Date of Patent: Feb. 14, 2017

(54) FLEXIBLE STRIP BRUSH, FLEXIBLE BELT BRUSH, AND METHOD FOR MANUFACTURING THE SAME

(75) Inventors: Donald James Marler, III, Emmaus, PA (US); Marc Godin, Pittsfield, NH (US); Lawrence Nieder, Concord, NH (US); Matt Gorham, Hampstead, NH (US); Roy Wirth, Northfield, NH (US)

(73) Assignee: Felton, Inc., Londonderry, NH (US)

( * ) Notice: Subject to any disclaimer, the term of this patent is extended or adjusted under 35 U.S.C. 154(b) by 1079 days.

(21) Appl. No.: 12/795,248

(22) Filed: Jun. 7, 2010

(65) Prior Publication Data

US 2010/0319150 A1  Dec. 23, 2010

Related U.S. Application Data

(60) Provisional application No. 61/187,813, filed on Jun. 17, 2009.

(51) Int. Cl.
| | | |
|---|---|---|
| *A46B 3/04* | (2006.01) | |
| *A46D 3/04* | (2006.01) | |
| *A46B 5/06* | (2006.01) | |
| *B29C 47/02* | (2006.01) | |
| *A46B 13/00* | (2006.01) | |

(Continued)

(52) U.S. Cl.
CPC . *A46B 3/04* (2013.01); *A46B 5/06* (2013.01); *A46D 3/045* (2013.01); *B29C 47/026* (2013.01); *A46B 13/001* (2013.01); *B29K 2021/003* (2013.01); *B29K 2077/00* (2013.01); *B29K 2101/10* (2013.01); *B29K 2101/12* (2013.01); *B29K 2105/0088* (2013.01); *B29K 2995/0082* (2013.01); *B29L 2031/42* (2013.01); *B65G 45/18* (2013.01); *B65G 51/00* (2013.01)

(58) Field of Classification Search
CPC .............. A46D 1/00; A46B 3/005; A46B 7/00
USPC ................ 15/159.1, 186, 256.5, 183; 300/21
See application file for complete search history.

(56) References Cited

U.S. PATENT DOCUMENTS 2,281,412 A  4/1942  Cave et al.
2,576,546 A  11/1951  Starr
(Continued)

FOREIGN PATENT DOCUMENTS

CH  605350  12/1977
JP  60223708  11/1985

OTHER PUBLICATIONS

Wohler Brush Tech Gmbh, Brush Machine MSB 960 for Production of Flexible Strip Brushes, from company's website, Feb. 16, 2011.
(Continued)

*Primary Examiner* — Monica Carter
*Assistant Examiner* — Stephanie Berry
(74) *Attorney, Agent, or Firm* — Peter A. Nieves; Sheehan Phinney Bass & Green, PA

(57) ABSTRACT

A flexible strip brush element is constructed from multiple monofilaments arranged in a parallel fashion and attached at one end to a flexible base. The monofilaments are attached to the base by intermingling material from the base with material from the monofilaments. The free ends of the monofilaments collectively form a bristle end zone. A plurality of flexible strip brush elements may be bonded side-by-side so the free ends of the monofilaments form a common bristle end zone. The bonded flexible strip brush elements may take the form of a linear section or may be fashioned into an endless loop or jointless spiral.

32 Claims, 16 Drawing Sheets

(51) Int. Cl.
    *B65G 45/18*     (2006.01)
    *B65G 51/00*     (2006.01)
    *B29K 21/00*     (2006.01)
    *B29K 77/00*     (2006.01)
    *B29K 101/10*    (2006.01)
    *B29K 101/12*    (2006.01)
    *B29K 105/00*    (2006.01)
    *B29L 31/42*     (2006.01)

(56) References Cited

U.S. PATENT DOCUMENTS

| | | | |
|---|---|---|---|
| 2,784,835 A | 10/1952 | Dixon | |
| 2,879,882 A | 3/1959 | Whelan | |
| 3,100,564 A | 8/1963 | Levy | |
| 3,137,021 A * | 6/1964 | English | 15/182 |
| 3,182,808 A | 5/1965 | Benoit et al. | |
| 3,252,561 A | 5/1966 | Kelton | |
| 3,253,692 A | 5/1966 | Ota | |
| 3,315,789 A | 4/1967 | Egles | |
| 3,661,245 A | 5/1972 | Mol et al. | |
| 3,679,050 A | 7/1972 | Anderson | |
| 3,750,225 A | 8/1973 | Gould et al. | |
| 4,014,060 A * | 3/1977 | Taylor | 15/36 |
| 4,036,355 A | 7/1977 | Valli | |
| 4,139,989 A | 2/1979 | Jones | |
| 4,276,674 A * | 7/1981 | Hunt | 15/182 |
| 4,488,634 A | 12/1984 | West | |
| 4,490,872 A | 1/1985 | Drumm | |
| 5,400,458 A * | 3/1995 | Rambosek | 15/179 |
| 5,518,794 A * | 5/1996 | Barber et al. | 428/95 |
| 5,605,383 A * | 2/1997 | Biocca | A46B 13/005 |
| | | | 300/21 |
| 5,931,457 A | 8/1999 | Todoki | |
| 6,298,516 B1 * | 10/2001 | Beals | A46B 5/02 |
| | | | 15/143.1 |
| 6,371,280 B1 | 4/2002 | Lidner | |
| 6,665,902 B1 | 12/2003 | Vegter | |
| 6,948,613 B2 | 9/2005 | Guldenfels | |
| 7,121,336 B2 * | 10/2006 | Hatley | 166/170 |
| 7,428,961 B2 | 9/2008 | Temming et al. | |
| 8,074,586 B2 | 12/2011 | Garner et al. | |
| 2002/0108196 A1 * | 8/2002 | Koregelos | 15/104.2 |
| 2003/0044245 A1 * | 3/2003 | Power | B65G 51/06 |
| | | | 406/190 |
| 2004/0065528 A1 | 4/2004 | Inoue | |
| 2004/0119237 A1 * | 6/2004 | Datta | 277/355 |
| 2006/0076218 A1 | 4/2006 | Marshall | |
| 2006/0118389 A1 | 6/2006 | Henley | |
| 2009/0223011 A1 * | 9/2009 | Brenken | 15/256.51 |
| 2010/0192821 A1 | 8/2010 | Garner et al. | |
| 2010/0319150 A1 | 12/2010 | Godin et al. | |

OTHER PUBLICATIONS

Direct Industry; http://www.directindustry.com/...%3D7&ID Visite=2619410&MotCle=&RefCat=IDProduit=19617&IDProdSource=&SourceType=Produit[Dec. 11, 2008 4:26:07 PM].

\* cited by examiner

FLEXIBLE STRIP BRUSH, FLEXIBLE BELT BRUSH, AND METHOD FOR MANUFACTURING THE SAME

CROSS-REFERENCE TO RELATED APPLICATION

This application claims priority to U.S. Provisional Patent Application entitled "Flexible Strip Brush, Flexible Belt Brush, and Manufacturing Method Therefor," having Ser. No. 61/187,813, filed 17 Jun. 2009, which is hereby incorporated by reference herein in its entirety.

FIELD OF THE INVENTION

The present invention is generally related to brushes, and more particularly is related to a flexible strip brushes and flexible belt brushes.

BACKGROUND

FIGS. 1 through 3 show a stapleset brush 900 in accordance with the prior art.

As can be seen in the perspective view of the stapleset brush 900 in FIG. 1, brush bristles 905, represented in FIGS. 1 through 3 as a bundle of individual bristles, extend from drilled or molded holes 901 in a solid block of material such as rubber, leather, metal, or wood serving as base 902. As can be seen from the side sectional view of FIG. 2, the side shown at FIG. 2 being the same side as faces the reader in FIG. 1, brush bristles 905 contain tufts or bundles of strands that are folded over, the folded portion being held against the surface at the bottom of the hole 901 by a wire staple 907 or other rigid fastener. This is shown in the end sectional view of FIG. 3, the end shown at FIG. 3 being, for example, the end at the right in FIG. 1. At FIG. 3, it is possible to see the profile of the staple 907, this being such that the ends of the staple 907 are embedded and held firmly within the bulk material of the base 902.

Several difficulties arise when one attempts to employ the stapleset structure 900 of the prior art shown in FIGS. 1 through 3 as a belt brush or in another such application where flexibility is required.

For example, a belt brush employed in a conveyor or cleaning application might be made to undergo flexible deformation as it is driven within the transport mechanism of which it forms a part. For example, a belt-driven conveyor brush or cleaning brush in such an application might be driven by pulleys or made to wrap around idlers that cause the brush to bend around the radius of curvature of the pulley or idler. However, where the base 902 is fashioned from a rigid material such as metal or wood, the stapleset brush 900 will, needless to say, be inflexible and thus unsuitable for use as a belt brush in such an application.

Furthermore, even where the base 902 is fashioned from a less rigid material such as rubber, the fact that the staple 907 is typically stiffer than the material of the base 902, which is to say that the staple 907 and the base 902 in such case would have dissimilar moduli of elasticity, can cause localized stresses to occur in the vicinity of the staple 907, such stresses being made all the more severe to the extent that the staple 907, which is typically fashioned from a cut piece of wire, has sharp ends, corners, or edges. Such stresses can cause increased wear, shortened life, and failure of the stapleset brush 900. Of course, any stresses arising due to presence of the staple 907 will only be aggravated and made more intense by flexible deformation of the sort that such a belt brush will typically be made to undergo, further contributing to increased wear, shortened life, and failure of the stapleset brush 900.

Moreover, to properly embed the staple 907 within the base 902, the base 902 must have a certain minimum height, the height direction here being the direction in which the bristles 905 extend from the base 902 in FIGS. 1 through 3. However, thickness of the base 902 in this height direction contributes to the second moment of inertia about an axis perpendicular to a plane formed by the face of the base 902 indicated in, for example, FIG. 2. Specifically, the thickness of the base 902 in the height direction causes the base 902 to resist bending such as would cause the ends of the base 902 to flex so as to conform to a radius of curvature centered on an axis emerging from the plane of the base 902 at a point above or below the stapleset brush 900 as viewed in FIGS. 1 and 2. Forcing the base 902 of the stapleset brush 900 to conform to such a radius of curvature despite this stiffness or resistance to bending due to the large second moment of inertia, as might be done were the stapleset brush 900 to be employed as a belt brush driven by pulleys in a transport mechanism, for example, would create high stresses in the base 902, both in the vicinity of the staple 907 as well as in the vicinities of the top and bottom of the base 902. Such stresses can also cause increased wear, shortened life, and failure of the stapleset brush 900.

In addition, in a structure in which the bristles 905 contain tufts that are folded over and attached by stapling to the base 902, there will of necessity be gaps between adjacent tufts due to presence of the wall containing base material 902 serving as partition between adjacent holes 901. In the structure shown in FIGS. 1 through 3, bristle density will be discontinuous along the length direction (i.e., the direction extending from left to right in FIG. 1 or FIG. 2), bristle density being high where bunched bristles 905 emerge from a hole 901, and being low between holes 901 where no bristles 905 emerge. This effect can to some extent be mitigated by employing a design in which bristles 905 fan out from their proximal regions, where they emerge from the holes 901, to their distal regions, where the bristles 905 collectively form a bristle end zone. Depending on the application in question, this bristle end zone might serve as conveyor drive face for transport of small objects including, but not limited to, nuts, bolts, pills, and/or other such objects to be conveyed, might serve as cleaning brush for cleaning parts or surfaces, or might serve as sealing surface for sealing a shuttle canister within a pneumatic tube transport system for use at a bank drive-up window, for example. Nonuniformity in bristle density within the bristle end zone can cause poor conveyor drive characteristics in an application in which the bristle end zone serves as conveyor drive face, poor cleaning performance in an application in which the bristle end zone serves to sweep or scour a floor or other surface, poor sealing in an application in which the bristle end zone serves as sealing surface, and other performance problems. In addition, the gaps that exist between adjacent tufts impose a limit on the maximum bristle density that can be achieved, and this limit on maximum achievable bristle density can also adversely impact achievable bristle end zone characteristics.

In such a design according to the prior art, there are practical limits to the width (i.e., the direction extending from left to right in FIG. 3) of the bristle end zone formed by the bristles 905 that can be achieved. For example, beyond a certain width, it may be difficult for the staple 907 to retain the bristles 905 at all points along the bottom of the hole 901. Furthermore, as can be seen in FIG. 3, proper embedding of the staple 907 within the base 902, such as will prevent the cut ends of the staple 907 from protruding from the sides of the base 902, necessitates that there be a certain minimum wall thickness to either side of the hole 901 in the width direction (i.e., the direction extending from left to right in FIG. 3). This being the case, even if one were to, for example, laminate multiple flexible strip brush elements together in side-by-side fashion in an attempt to extend the effective width of the brush, a stapleset brush 900 having design as shown in FIG. 3 would be limited with respect to the density of bristles 905 that is achievable in the width dimension due to presence of this minimum wall thickness to either side of the hole 901 in the width direction, in similar fashion as the limitation presented by the thickness of the wall serving as partition between adjacent holes 901 in the length direction which was described above.

The physical properties of the material employed as bristles 905 will in general impose constraints on overall tuft height, width, and length. For example, if the bristles 905 contain polypropylene or other such thermoplastic substance or other material having similar modulus of elasticity, mechanical properties of the material employed for the bristles 905 will limit the dimensions of the bristles 905 to certain practical ranges from the standpoints of manufacturing and performance.

For example, to achieve a brush 900 having bristles 905 with the requisite physical characteristics for the application in question, and in particular to achieve a brush 900 having such desired physical characteristics at the ends of the bristles 905 forming the bristle end zone, it will in general be necessary to impose limits on the ranges that can be employed for bristle length and diameter, and such ranges will be further limited upon considering the requisite average bristle density (e.g., number of bristles per square inch) and allowable nonuniformity in that bristle density.

For these and other reasons, a stapleset brush 900 manufactured in accordance with the prior art as shown in FIGS. 1 through 3 will often be inadequate except when employed in a comparatively narrow assortment of limited configurations. For example, as explained above, the stapleset brush 900 of the prior art may be inadequate where width is desired at the bristle end zone formed by the ends of the bristles 905, where high bristle density is desired at the bristle end zone formed by the ends of the bristles 905, where good uniformity in bristle density is desired at the bristle end zone formed by the ends of the bristles 905, or where it is desired that the stapleset brush 900 exhibit good flexibility with respect to flexure about an axis perpendicular to the plane of the bristles 905, such as would be the case were the stapleset brush 900 to be fashioned in an endless loop for driving by pulleys and idlers.

Although the difficulties mentioned above by way of example are described as applying to the stapleset structure 900 of the prior art shown in FIGS. 1 through 3, one or more of the foregoing difficulties may apply to structures from the prior art other than those shown in FIGS. 1 through 3. Furthermore, while various aspects and embodiments of the present invention may overcome one or more of the difficulties described above, not every difficulty mentioned above is necessarily overcome by all aspects and embodiments of the present invention, and in fact there may be aspects and embodiments of the present invention that overcome difficulties in the prior art other than those mentioned by way of example above.

Whether such difficulties exist in the prior art shown in FIGS. 1 through 3 or in other structures from the prior art that are not shown, a heretofore unaddressed need exists in the industry to address such deficiencies and inadequacies.

SUMMARY

Embodiments of the present invention provide, among others, a flexible strip brush element, a flexible strip brush made from at least one flexible strip brush element, a flexible belt brush element, and a flexible belt brush made from at least one flexible belt brush element.

Briefly described, one embodiment, is a flexible strip brush element, having a base with a top and a bottom and a multiplicity of monofilaments. Each of the monofilaments has a proximal end and a distal end. The flexible strip brush element has a bristle attachment region wherein the monofilaments are arranged in substantially parallel fashion. The proximal ends of the monofilaments are attached to the top of the base by way of the bristle attachment region, and the distal ends of the monofilaments are free and collectively form a bristle end zone. Within the bristle attachment region there is intermingling of a material from the base and a material from the monofilaments. The material from the base fills interstices between the monofilaments.

A flexible strip brush element may have a flexural modulus that is less than 80 ksi as determined by ASTM D790. The base may have a flexural modulus that is between 13 and 65 ksi as determined by ASTM D790, with a base width between 2.5 mm and 6 mm, and monofilaments that are between 0.003 inch and 0.024 inch in diameter, and between 0.20 inch and 6.00 inches in length. Alternatively, a flexible strip brush element may have a the base having a flexural modulus that is between 13 and 20 ksi as determined by ASTM D790, with a base between 3.2 mm and 4.5 mm in width and having monofilaments between 0.006 inch and 0.016 inch in diameter, and between 1.50 inch and 3.00 inches in length.

A flexible strip brush element may be implemented where the monofilaments are made of thermoplastic resin and the base is made of thermoplastic resin or thermosetting resin. Or the monofilaments may be from nylon, polypropylene, or blended mixtures of nylon and polypropylene. The base may be made from nylon, polypropylene, a copolymer of nylon and a thermoplastic elastomer, and blended mixtures of any of the foregoing species. The base of the flexible strip brush element may have a U-shaped cross-sectional profile such that the proximal ends of the monofilaments are attached by way of the bristle attachment region on the concave side of the base. Alternatively, The base may have an H-shaped cross-sectional profile with a first concave side at the top where the proximal ends of the monofilaments are attached by way of the bristle attachment region, and a second concave side at the bottom of the base. Or base may only an inverted U-shaped cross-sectional profile defining a concave side at the bottom of the base.

Another embodiment is a flexible strip brush formed from two or more flexible strip brush elements that are mutually bonded in side-by-side fashion so that the free distal ends of the monofilaments cooperate to form a common bristle end zone. The mutual bonding in side-by-side fashion may be at least partially accomplished by a side bonding region. The side bonding region may utilize coextrusion, lamination, glue, heat, or solvent. The mutual bonding in side-by-side fashion may be at least partially accomplished by a bottom bonding region. The bottom bonding region may utilizes thermal bonding, adhesive, chemical bonding, coextrusion, or lamination. The bottom bonding region may be a laminated carrier strip made of flexible thermoplastic resin, made from, for instance, nylon and/or polypropylene.

A flexible belt brush element is a flexible strip brush element, as described above, where the two ends of the base are joined by means of a joint to form an endless loop. The base has a width, the endless loop has a circumference, and the joint may be a scarf joint in which a length of the joint in the direction of the circumference of the endless loop is approximately equal to the width of the base. The length of the joint in the direction of the circumference of the endless loop may be approximately equal to the circumference of the endless loop. The joint may be reinforced by cloth, tape, plastic sheeting, or a high-strength fiber-like material. The joint may be formed by thermal bonding, adhesive, or solvent welding.

A flexible belt brush is formed from two or more belt brush elements that are mutually bonded in side-by-side fashion so that the free distal ends of the monofilaments cooperate to form a common bristle end zone. The mutual side-by-side bonding may be partially accomplished by a side bonding region or a bottom bonding region. The bottoms of the bases may cooperate to form a common belt drive surface. The base may be formed from a flexible brush element wound in helical fashion, adjacent coils of the helically wound base being bonded in side-by-side fashion to form a jointless spiral.

A method for manufacturing a flexible strip brush element, includes multiple steps. One step is arranging a multiplicity of thermoplastic monofilaments respectively having first ends and second ends in substantially parallel fashion and at a prescribed density. Another step is applying heat to the first ends of the monofilaments so as to melt the first ends of the monofilaments. Other steps include transporting the monofilaments in a first direction toward an extrusion die, extruding molten thermoplastic resin in a second direction from an extrusion die outlet, where the outlet is shaped to produce a base having a top and a bottom, bringing the first ends of the monofilaments into physical contact with the top of the base as the base emerges from the extrusion die outlet, and cooling the monofilaments and the base so that the first ends of the monofilaments are fused to the top of the base and the second ends of the monofilaments are free. The thermoplastic resin used for the extruded base has a flexural modulus less than 80 ksi as determined by ASTM D790 when solid. The second direction is approximately perpendicular to the first direction. Between the emergence of the base from the extrusion die outlet and the cooling of the monofilaments and the base, movement of the base is made to undergo a change of direction from the first direction to the second direction.

An alternative to the cooling step described above is curing the base so that the first ends of the monofilaments are fused to the top of the base and the second ends of the monofilaments are free. The thermosetting resin used for the extruded base may have a flexural modulus less than 80 ksi as determined by ASTM D790 when cured.

A method for manufacturing a flexible strip brush from a plurality of flexible strip brush elements, includes the steps of arranging in side-by-side fashion a plurality of adjacent flexible strip brush elements, and mutually bonding the adjacent strip brush elements in side-by-side fashion so that the free distal ends of the monofilaments cooperate to form a common bristle end zone. A step may be forming a side bonding region or a bottom bonding region as described above. The method may include pressing a heated nonstick tool against the bottoms of the bases while dragging the tool therealong so as to cause melting of the bases to a depth sufficient to cause the flexible strip brush elements to become mutually joined when the melted bases are allowed to cool and resolidify.

Other embodiments, systems, methods, and features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
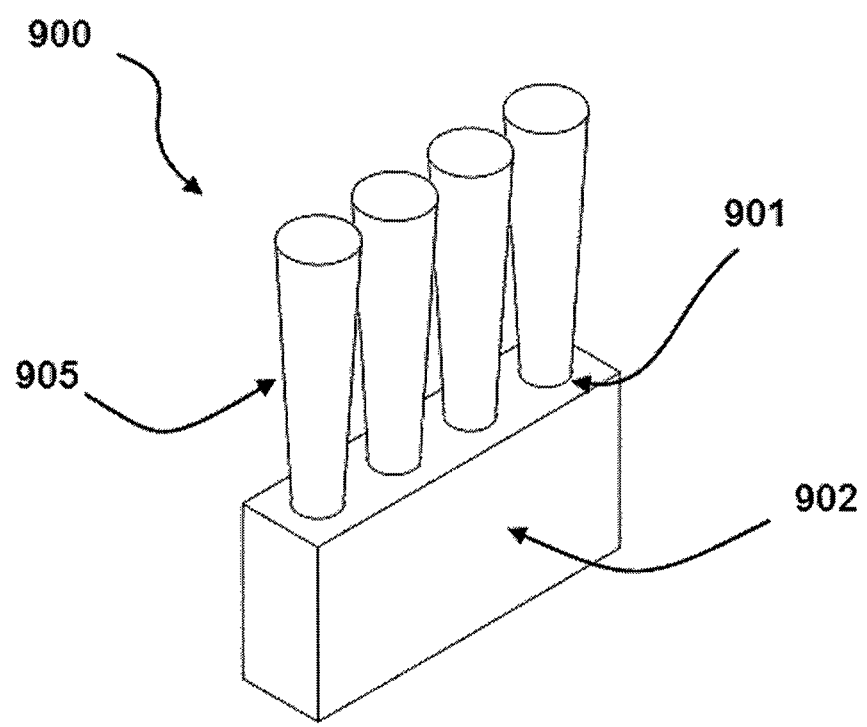
FIG. 1 is a perspective view of a stapleset brush manufactured in accordance with the prior art.
Figure 2:
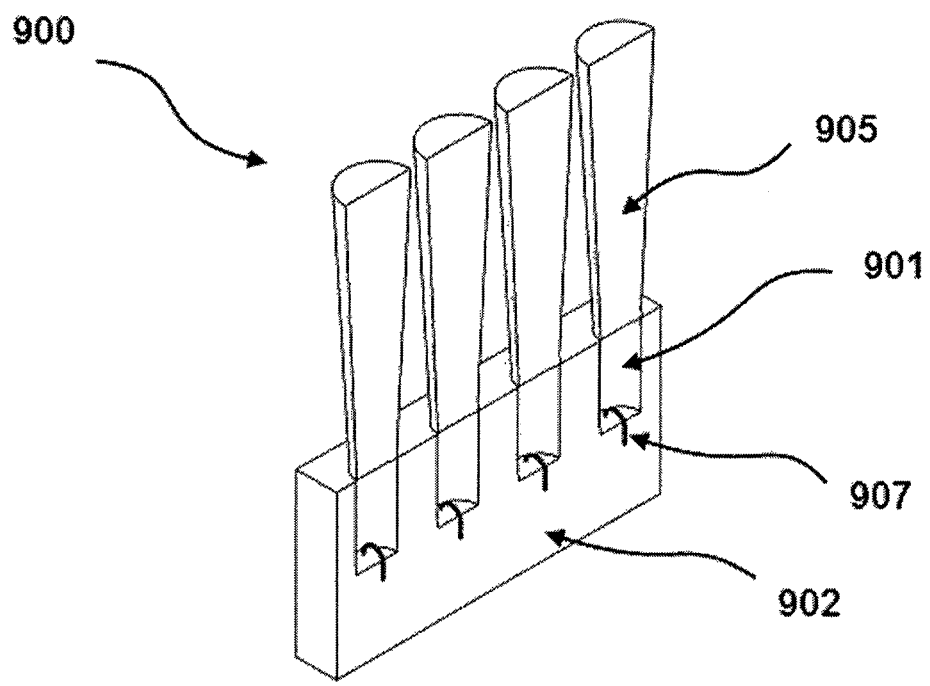
FIG. 2 is a side sectional view of the stapleset brush shown in FIG. 1.
Figure 3:
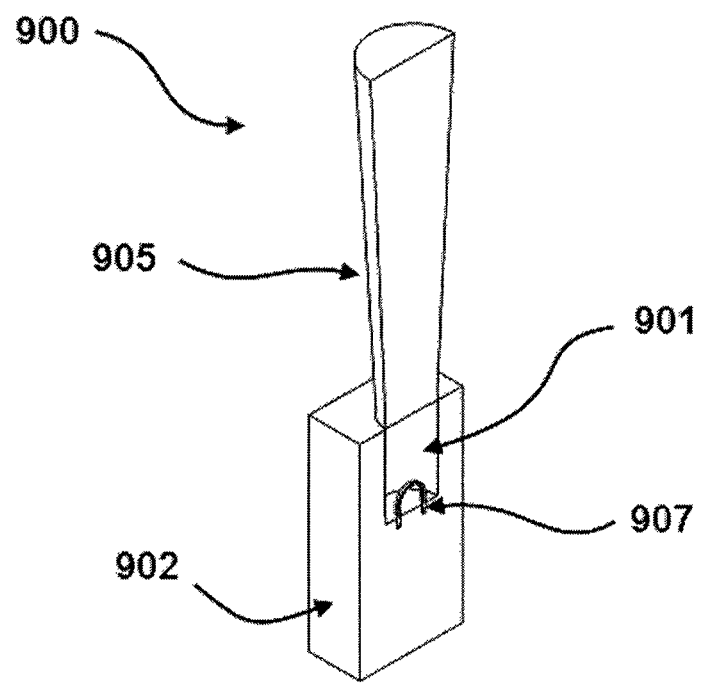
FIG. 3 is an end sectional view of the stapleset brush shown in FIGS. 1 and 2.
Figure 4:
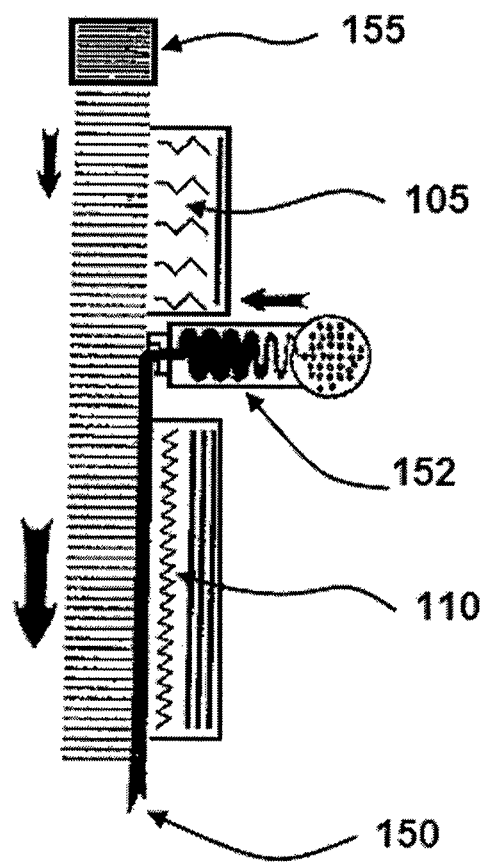
FIG. 4 is a drawing showing a method for manufacturing a flexible strip brush element in a first embodiment in accordance with a first aspect of the present invention.

One aspect of the present invention is a flexible strip brush element and a manufacturing method therefor FIG. 4 illustrates a method for manufacturing a flexible strip brush element 150 according to a first embodiment of the present invention.

As shown by FIG. 4, a stock of bristle monofilaments 155 of suitable diameter, e.g., 0.006 inch, preferably 0.003 inch to 0.024 inch, most preferably 0.006 inch to 0.016 inch, separately manufactured from nylon, polypropylene, or other suitable thermoplastic resin by extrusion using a multistrand die, for example, are cut to desired length, preferably 0.20 inch to 6.00 inch, most preferably 1.50 inch to 3.00 inch, and are arranged with desired density at a location a suitable distance from the outlet of an extrusion die. As the monofilament stock 155 is transported toward the extrusion die outlet, heat 105 is applied to one end of the monofilaments 155 so as to melt the bristle ends.

The molten bristle ends are transported toward a location where molten thermoplastic resin of composition compatible with the composition of the monofilaments 155 (e.g., nylon, polypropylene, or other suitable thermoplastic resin, including any of various copolymers and/or blended mixtures thereof) emerges from the extrusion die. The extrusion die is shaped so as to produce a brush base 152 of suitable dimensions. For example, based upon considerations related to ease of handling of individual strip brush elements for creation of a flexible belt, the extruded brush base 152 in one embodiment might be 2.5 mm to 6 mm in width, and more preferably might be 3.2 mm to 4.5 mm in width. As the molten bristle ends are brought into physical contact with the molten base material as it emerges from the extrusion die, the bristle ends fuse with the base 152 as the molten portion of the monofilaments 155 and the base 152 are made to blend together and molten base material is made to flow around and fill interstices between monofilaments 155. Note that if increased bonding strength and increased bonding surface area are desired, this can be achieved by carrying out more aggressive application of heat 105 so as to cause more extensive melting of the bristle ends, as well as bonding of bristle monofilaments 155 with each other, prior to fusion of the melted bristle ends with the extruded base 152.

With continued reference to FIG. 4, at or about the time that the monofilaments 155 and base 152 are fused together in the vicinity of the extrusion die outlet, whereas the monofilaments 155 continue to travel in essentially the same direction in which they had been traveling, the base 152 is made to undergo a 90-degree change of direction so as to facilitate combination of the monofilaments 155 with the base 152, following which the combined monofilaments 155 and base 152 are then transported to a water bath or other such cooling station 110 at which the molten, fused material of the monofilaments 155 and the base 152 can be solidified together.

Note that as used herein, the terms "melting" and "molten" refer to creation of a liquid or soft state. That is, even where a liquid state is not necessarily achieved, so long as the material in question is soft enough to permit, blending, intermingling, and/or fusion as described above, such a state is included within the range of what is referred to herein as "melting" and "molten."

Although the foregoing has been described in terms of an example in which thermoplastic resin was used as material for the brush base 152, there is no particular objection to employment of thermosetting resin as base material. In the event that thermosetting resin is employed as base material, one of skill in that art will readily understand how to adapt the foregoing description to a manufacturing method in which bristle monofilaments 155, which may optionally be heated and made to melt at one end, are fused with liquid (at least partially uncured) thermosetting resin as it emerges from an extrusion die, with a curing station being employed instead of cooling station 110.

Figure 5:
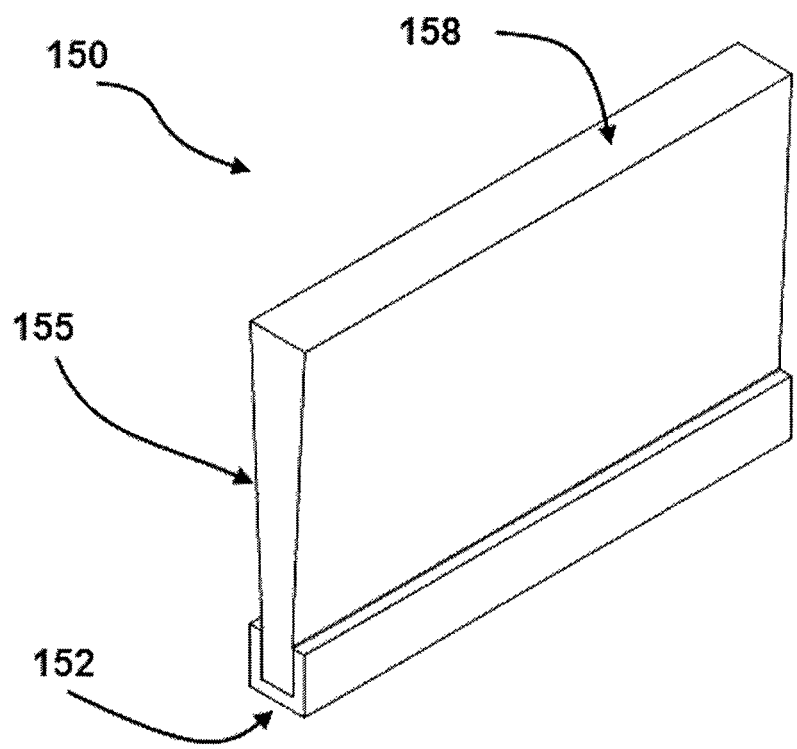
FIG. 5 is an end sectional view of a flexible strip brush element such as might be manufactured using the manufacturing method described with reference to FIG. 4.

Referring to FIG. 5, this shows a flexible strip brush element 150 in a first embodiment such as might be manufactured using the manufacturing method described with reference to FIG. 4. A flexible belt brush of this design would have a flexural modulus less than 80 ksi, preferably between 13 and 65 ksi, and more preferably between 13 and 20 ksi, as determined for example by ASTM D790. Such flexural moduli may be achieved by selection of suitable material for use as the base 152. For example, a copolymer of nylon and a suitable thermoplastic elastomer (hereinafter "TPE") may be advantageously employed to achieve a base 152 having flexural modulus within such ranges. This flexibility of the base material permits manufacture of a brush having the ability to be constructed into a belt, especially when a plurality of strip brush elements are assembled in side-by-side fashion to form the belt.

Figure 13:
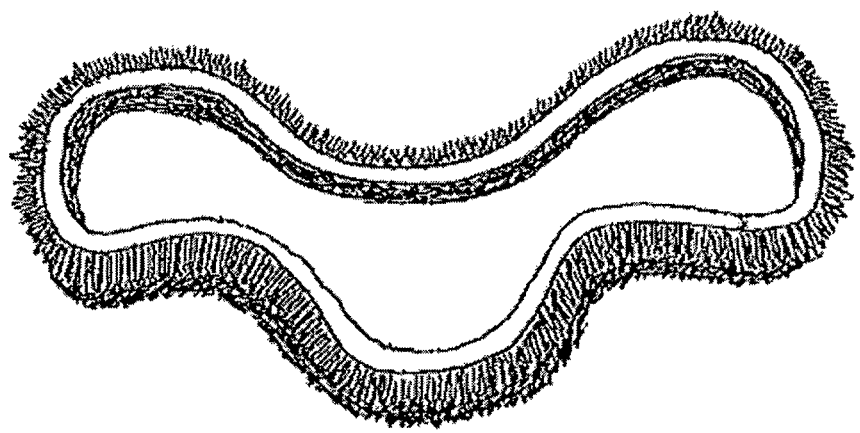
FIG. 13 is a drawing showing a flexible belt brush manufactured in accordance with an embodiment of the present invention, the flexible belt brush being shown in a configuration intended to emphasize the superior flexibility thereof with respect to flexure about an axis perpendicular to the plane of the bristles.
Figure 14:
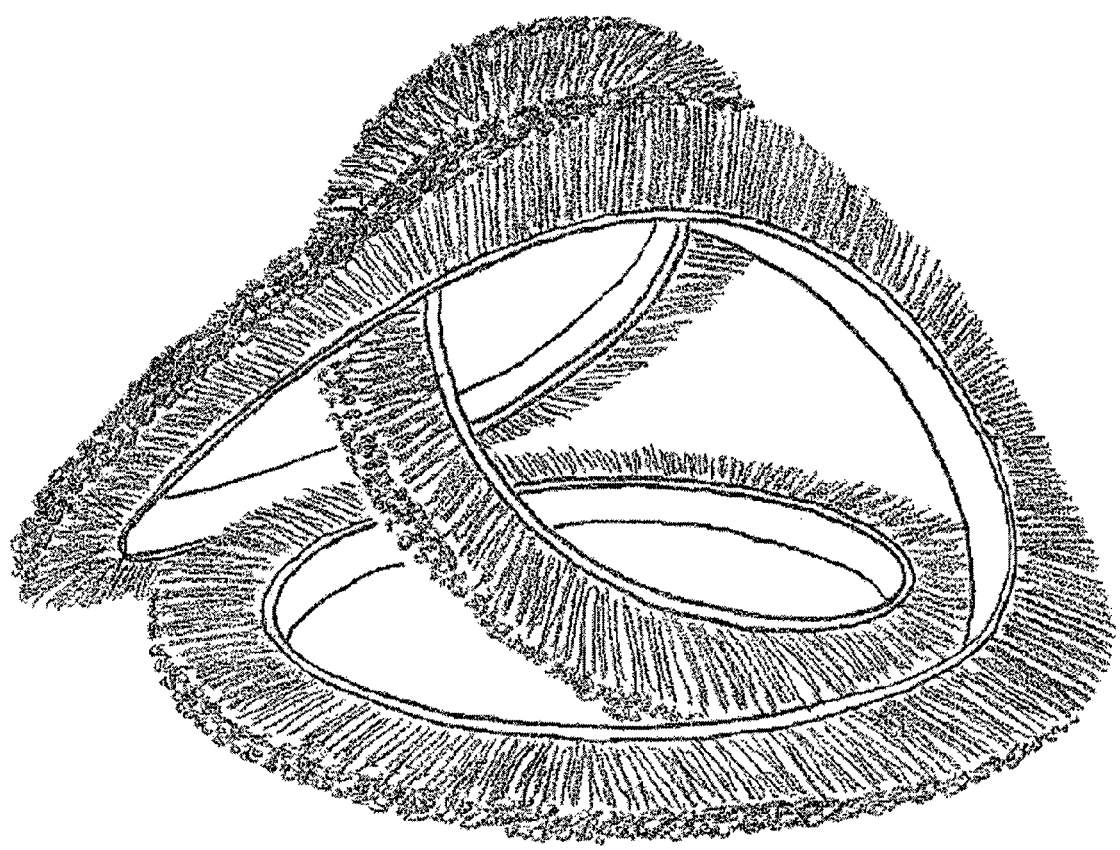
FIG. 14 is another drawing showing a flexible belt brush manufactured in accordance with an embodiment of the present invention, the flexible belt brush being shown in a configuration intended to emphasize the superior flexibility thereof with respect to flexure as well as torsion.
Figure 15:
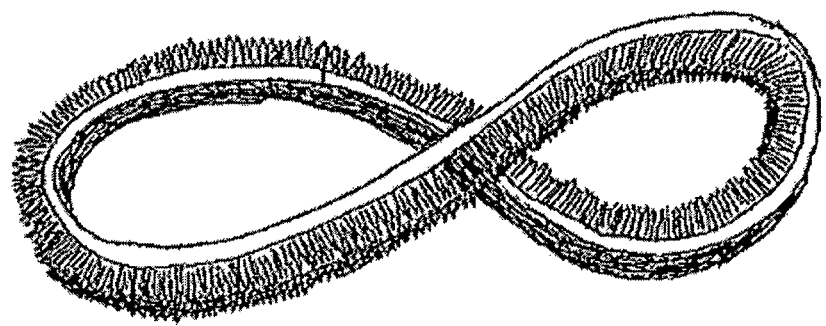
FIG. 15 is yet another drawing showing a flexible belt brush manufactured in accordance with an embodiment of the present invention, the flexible belt brush being shown in a configuration intended to emphasize the superior flexibility thereof with respect to flexure as well as torsion.

As used herein, except where otherwise clear from context, the term "belt" (and/or "belt brush") is used to mean a continuous band for use in transferring motion or power, for use in cleaning, for use in conveying objects or materials, or for use as a seal, for example. As such, depending on the application in question, belts manufactured in accordance with embodiments of the present invention are able to take on many shapes and configurations as required by the specific application. Examples of belt configurations that may be manufactured in accordance with various embodiments of the present invention include oval, serpentine, reverse-directional, and figure-eight. Moreover, belts manufactured in accordance with embodiments of the present invention may have multiple radii along the length of the belt brush, and/or may have the ability to conform to very small radii of curvature, e.g., on the order of 0.25 inch or less, and still be able to maintain flexibility. Various exemplary belt brush configurations emphasizing this flexibility and versatility of belt brushes manufactured in accordance with the present invention are shown at FIGS. 13 through 15.

Note that where adjacent strips, or adjacent coils, are said to be bonded in side-by-side fashion, this is not to imply that a side bonding region (described below) need be used to accomplish this. That is, side-by-side bonding may in general be carried out through use of side bonding region(s) and/or bottom bonding region(s), both of which are described in more detail below.

From the sectional end view shown in FIG. 5 it should be understood that the flexible strip brush element 150 may take the form of a linear section or may be fashioned into an endless loop or jointless spiral. If fashioned in the form of a linear section, this might be applied about the circumference of a shuttle canister that opens in clamshell fashion, leaving a gap to permit the canister to open, if used to slidably seal gaps between canister and tube in a pneumatic tube transport system, or might be made to engage in reciprocating motion by the mechanical components of a suitable transport mechanism if used as a conveyor brush or cleaning brush, for example. If fashioned in the form of an endless loop or jointless spiral, this might be fitted over the end of an end-opening shuttle canister if used to slidably seal gaps between canister and tube in a pneumatic tube transport system, or might be employed as a belt brush capable of being driven about pulleys and idlers.

Figure 7:
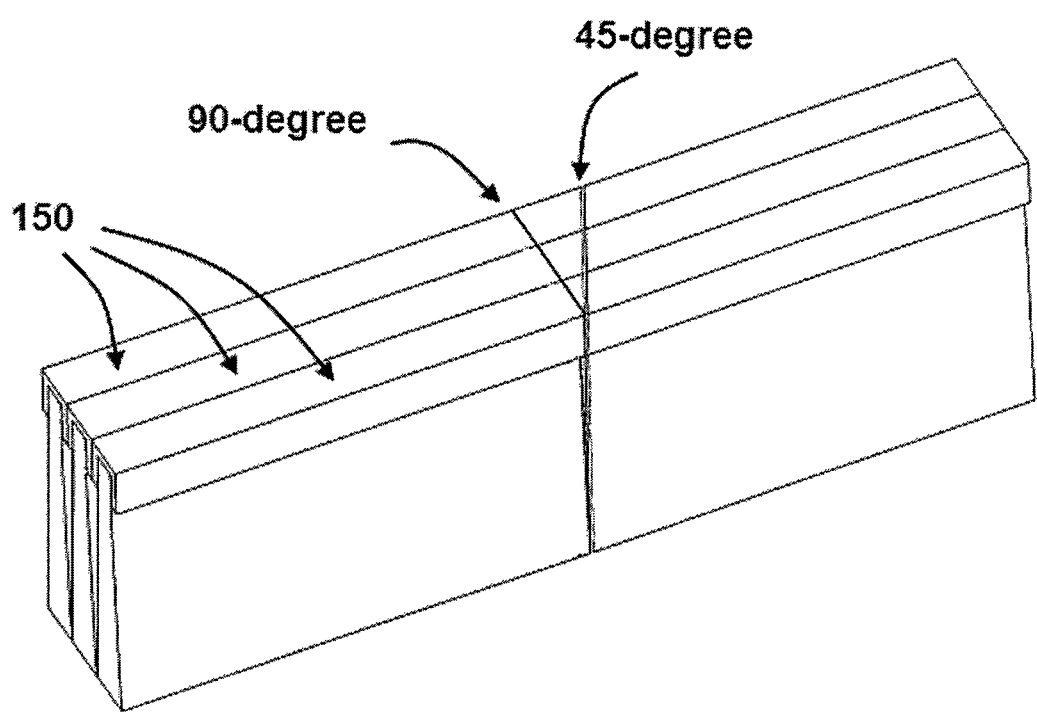
FIG. 7 is a perspective view of a portion of a flexible belt brush that has been fashioned in the form of an endless loop through use of a scarf joint to mate the ends of a linear section of a flexible belt brush similar to that shown in FIG. 6 or FIG. 11.

To fashion the flexible strip brush element 150 into an endless loop, a linear section of the flexible strip brush element 150 of appropriate length would be prepared, and the two ends of this linear section would be mated and bonded together using heat, glue, or solvent, for example, to form a joint (see FIG. 7). Any suitable type of joint, including lap joints, scarf joints, and butt joints, may be used when the ends of the linear section are joined to form an endless loop. Such joints may be unreinforced or may be reinforced by sewing, stapling, crimping, or otherwise binding across the seam of the joint using, for example, a suitable high-strength fiber-like material, or cloth, tape, or plastic sheet stock. Although there is no particular objection to use of metal wire, staples or other such hard fasteners or materials to reinforce the joint, especially for applications in which the belt brush must go around corners or conform to tight radii of curvature, e.g., when used as belt brush driven by pulleys or made to wrap around idlers, softer materials such as cloth, tape, or plastic sheet stock are generally preferred.

At this time, although there is no particular objection to use of a butt joint in which the seam of the joint makes an angle of 90 degrees with the sides of the belt, it may facilitate formation of a smooth joint in some embodiments if the ends of the linear section are cut at, for example, a 45 degree angle before they are mated and bonded together so as to form a scarf joint in which the length of the joint in the circumferential direction is approximately equal to the width of the belt. Similarly, the ends may be cut at a shallower angle before formation of the scarf joint so as to increase the length of the joint in the circumferential direction up to as much as the full circumference of the endless loop belt.

Figure 8:
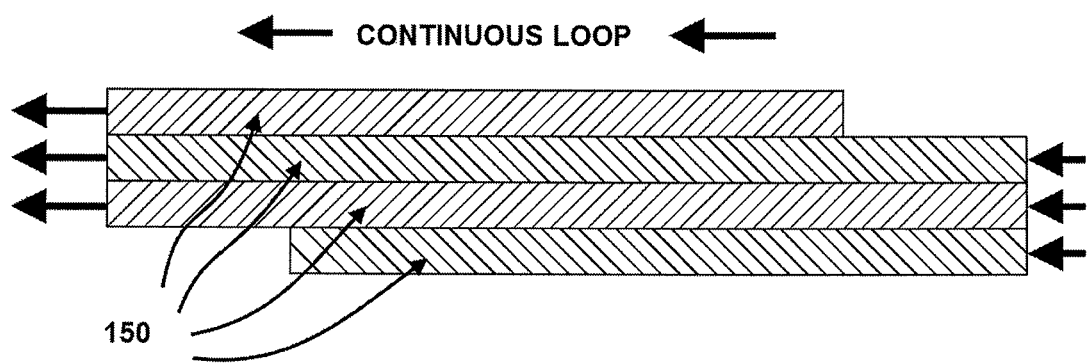
FIG. 8 is a bottom view of a portion of a flexible belt brush that has been fashioned in the form of a jointless spiral by wrapping a single long flexible strip brush element, such as that shown in FIG. 5 or FIGS. 9 and 10A, around a cylindrical mandrel in helical fashion.

Moreover, instead of joining the ends of a linear section of the flexible strip brush element 150 to form an endless loop, it is also possible to form the linear section into a jointless spiral by wrapping such a linear section around a cylindrical mandrel in helical fashion, and bonding adjacent coils of the spiral together in side-by-side fashion, (see, e.g., FIG. 8).

At the flexible strip brush element 150 shown in FIG. 5, the monofilaments 155 are attached at one end (the proximal end) to the extruded base 152 to which they have been fused, the monofilaments 155 cooperating at their free ends (distal ends) 158 to form a bristle end zone. Depending on the application in question, this bristle end zone might serve as conveyor drive face capable of nestling therewithin and carrying therealong small objects including, but not limited to, nuts, bolts, pills, and/or other such objects to be conveyed, might serve as cleaning brush for cleaning parts or surfaces, or might serve as sealing surface capable of sealing a shuttle canister within a pneumatic tube transport system, for example. That is, the flexible strip brush element 150 shown in FIG. 5 contains a multiplicity of brush bristles or monofilaments 155 arranged in substantially parallel fashion such that one end of each monofilament 155 is bonded to a flexible base 152 and the other end 158 of each monofilament 155 is free.

In one embodiment, the flexible base 152 to which the monofilaments 155 are attached is capable of acting as a drive belt. In such an embodiment, one side of the base 152 acts as support for the monofilaments 155 that are attached thereto, while the other side of the base 152 serves as a drive belt capable of being driven by pulleys, idlers, or other such transport mechanism drive components. In operation, when the belt side of the base 152 in such an embodiment is driven by an appropriate transport mechanism, the free ends 158 of the monofilaments 155 cooperate to form a bristle end zone.

The flexible strip brush element 150 in such an embodiment might be employed as a belt brush such as a conveyor brush or cleaning brush. For example, to form a conveyor brush, the ends of a linear section of the flexible strip brush element 150 might be joined after the fashion of an endless loop or jointless spiral. This belt-driven conveyor brush could then be driven by the pulleys and idlers of a transport mechanism. As the conveyor brush is driven in this fashion, the bristle end zone collectively formed by the free ends (distal ends) 158 of the monofilaments 155 of this conveyor brush might cooperate to capture or grab and carry therealong small objects including, but not limited to, nuts, bolts, pills, and/or other such objects to be conveyed.

As another example, this flexible strip brush element 150 might be employed as a seal for sealing a shuttle canister within a pneumatic tube transport system for use at a bank drive-up window. To form such a shuttle canister seal, the ends of a linear section of the flexible strip brush element 150 might be joined to form a flexible belt brush in the form of an endless loop or jointless spiral that is then fitted around and made to adhere to the outside circumference of an end-opening shuttle canister. Alternatively, if the shuttle canister opens in clamshell fashion, a linear section of the flexible strip brush element 150 might be wrapped around and made to adhere to the outside circumference of the shuttle canister at all locations except for a gap to allow the shuttle canister to open. This flexible belt brush could then form a seal between the shuttle canister and the tube walls of the pneumatic tube transport system so that the shuttle canister can be driven by air pressure and/or vacuum. As the shuttle canister is driven within the pneumatic tube transport system, the bristle end zone collectively formed by the free ends (distal ends) 158 of the monofilaments 155 of the flexible strip brush element 150 might cooperate to form a more or less airtight seal while allowing the shuttle canister to move within the pneumatic tube transport system.

Figure 6:
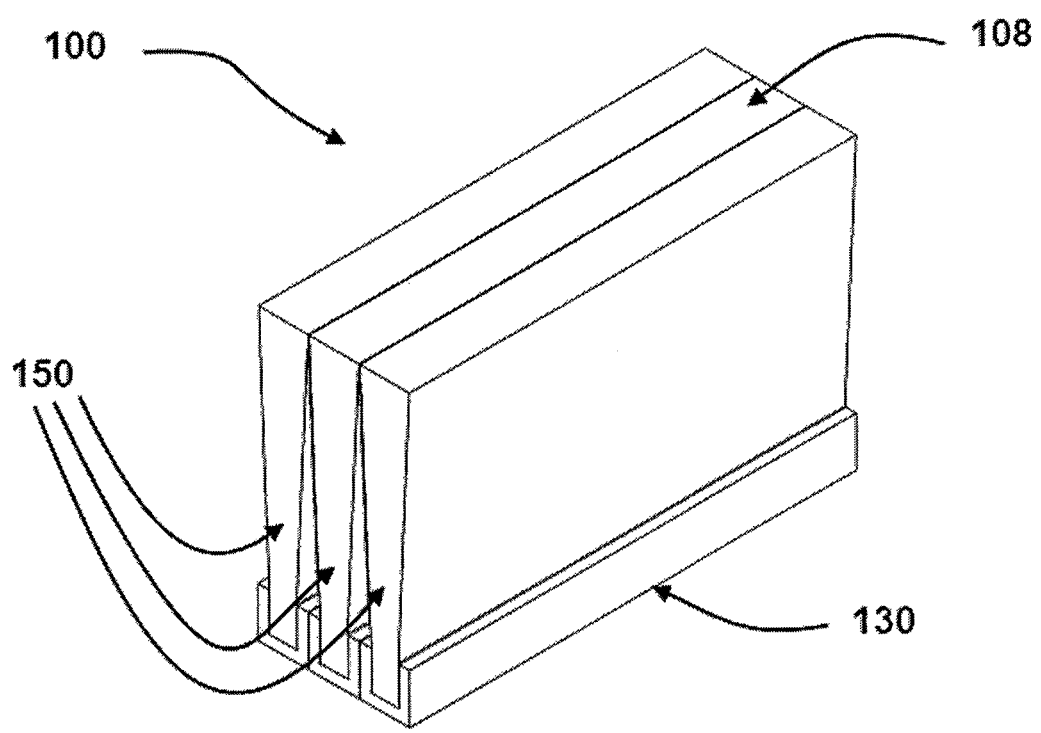
FIG. 6 is a perspective view of a flexible belt brush which, in accordance with a second aspect of the present invention, contains three flexible strip brush elements similar to the flexible strip brush element shown in FIG. 5.

Referring to FIG. 6, another aspect of the present invention is a flexible belt brush 100 containing one or more of the flexible strip brush elements 150 described with reference to FIG. 5.

As shown by FIG. 6, a flexible belt brush 100 suitable for slidably sealing gaps between canister and tube in a pneumatic tube transport system or as a flexible belt brush in a conveyor or cleaning application, for example, contains a plurality (here, three) flexible strip brush elements 150 as described with reference to FIG. 5. In the embodiment shown in FIG. 6, three flexible strip brush elements 150 as shown in FIG. 5 are bonded side-by-side by thermal bonding, glue, chemical bonding, coextrusion, or any other suitable method. In bonding the flexible strip brush elements 150 in side-by-side fashion, side bonding region(s) and/or bottom bonding region(s) may be employed as described below with reference to FIG. 11. In some embodiments, the flexible belt brush 100 so formed is such that the bottoms of the bases 152 cooperate to form a belt drive surface 130 capable of being driven by a suitable transport mechanism. As was the case with respect to description of the flexible strip brush element 150, the flexible belt brush 100 may take the form of a linear section or may be fashioned into an endless loop or jointless spiral. If fashioned in the form of a linear section, this might be applied about the circumference of a shuttle canister that opens in clamshell fashion, leaving a gap to permit the canister to open, if used to slidably seal gaps between canister and tube in a pneumatic tube transport system, or might be made to engage in reciprocating motion by the mechanical components of a suitable transport mechanism if used as a conveyor brush, for example. If fashioned in the form of an endless loop or jointless spiral, this might be fitted over the end of an end-opening shuttle canister if used to slidably seal gaps between canister and tube in a pneumatic tube transport system, or might be employed as a flexible belt brush capable of being driven about pulleys and idlers. Moreover, in the flexible belt brush 100 so formed, the free ends 158 of the monofilaments 155 of the flexible strip brush elements 150 cooperate to form a bristle end zone 108. For example, if the flexible belt brush 100 is employed as a conveyor brush, this bristle end zone 108 might collectively form a single conveyor drive face capable of nestling therewithin and carrying therealong small objects including, but not limited to, nuts, bolts, pills, and/or other such objects to be conveyed.

Where the flexible belt brush 100 is fashioned in the form of an endless loop, it should be understood that formation of a joint to mate the two ends of a linear section of the flexible belt brush 100 may be carried out in the same manner as described above with reference to the flexible strip brush element 150 of FIG. 5. An example in which a flexible belt brush similar to the flexible belt brush 200 described below with reference to FIG. 11 contains three flexible strip brush elements 250 has been fashioned in the form of an endless loop through use of a joint to mate the ends of a linear section thereof are shown at FIG. 7. The example shown in FIG. 7 depicts a 90-degree butt joint and a 45-degree miter (scarf) joint, and of course there is no objection to employment of any other suitable type of joint, such as an overlap joint.

Moreover, it should be understood that, like the flexible strip brush element 150 described above with reference to FIG. 5, the flexible belt brush 100 may be fashioned in the form of a jointless spiral, and that where this is done, the manner in which it may be carried out is similar to the description given above with reference to the flexible strip brush element 150 of FIG. 5. An example in which a single long flexible strip brush element 150 has been fashioned in the form of a jointless spiral by wrapping a linear section similar to that shown in FIG. 5 around a cylindrical mandrel in helical fashion is shown at FIG. 8.

For example, in a first working example, using four flexible strip brush elements 150 that were each approximately 4.5 mm in width and that were manufactured from a nylon-TPE copolymer base 152 and nylon monofilaments 155 of diameter 0.2 mm, a flexible belt brush 100 that was approximately 18 mm in width was fabricated by bonding the flexible strip brush elements 150 together in side-by-side fashion by heat-welding to melt and resolidify the bases 152, this then being made into a flexible belt brush 100 in the form of an endless loop by means of a glued joint, in which the ends were cut at a 45 degree angle, the two ends being sewn together using #21 gauge steel wire prior to application of cyanoacrylate adhesive as glue so as to form a wire-reinforced joint. The flexible belt brush 100 so formed was approximately 18 mm wide×30 mm high×480 mm in diameter. The flexible belt brush 100 of this first working example was found to perform satisfactorily for conveying objects of 0.25 inch diameter and larger, as well as flat objects such as a penny, or for cleaning the surface of a metal plate.

Moreover, in a second working example, using seven flexible strip brush elements 150 that were each 4.5 mm in width and that were manufactured from a nylon-TPE copolymer base 152 and nylon monofilaments 155 of diameter 0.006 inch, a flexible belt brush 100 of 0.89 inch width×0.28 inch height was fabricated by bonding the flexible strip brush elements 150 together in side-by-side fashion by heat-welding to melt and resolidify the bases 152, this then being made into a flexible belt brush 100 in the form of a linear section that was 19 inches in length and 0.28 inch in height for employment in a shuttle-type pneumatic tube transport apparatus. The flexible belt brush 100 of this second working example was found to perform satisfactorily for sealing a shuttle canister within a pneumatic tube transport apparatus.

Figure 9:
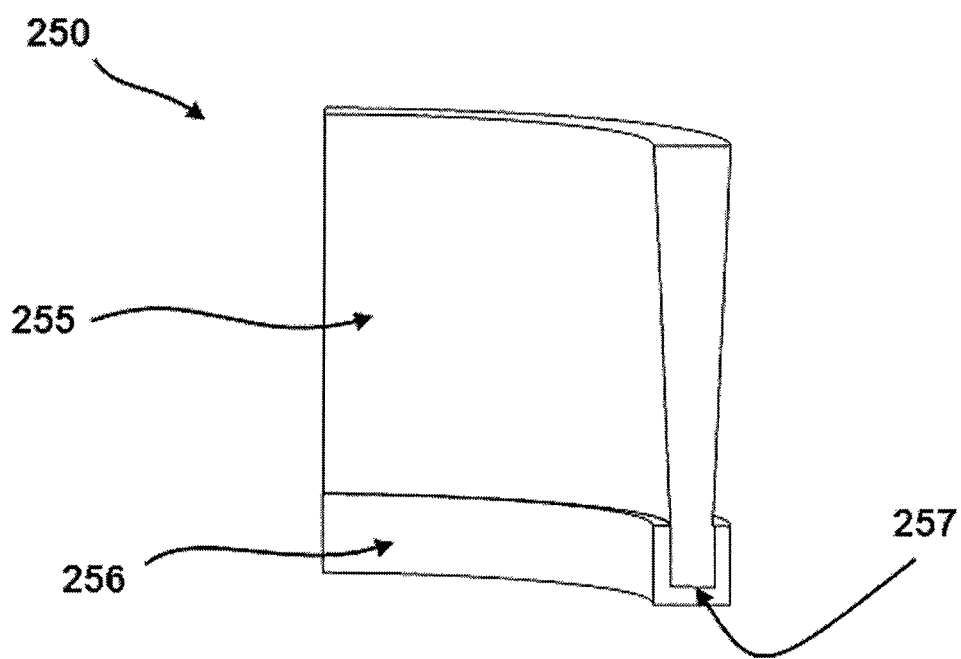
FIG. 9 is a perspective view of a flexible strip brush element in a second embodiment in accordance with the first aspect of the present invention.

FIG. 9, shows a flexible strip brush element 250 in a second embodiment such as might be manufactured using a manufacturing method similar to that described with reference to FIG. 4. The manufacturing method used to fabricate the flexible strip brush element 250 of the second embodiment shown in FIG. 9 is similar to the manufacturing method used to fabricate the flexible strip brush element 150 of the first embodiment shown in FIG. 5, except that the extrusion die employed for extrusion of the flexible strip brush element 250 of the second embodiment shown in FIG. 9 is shaped so as to cause the base 256 to have a channel-like, or U-shaped, cross-section. Employment of a base 256 having channel-like or U-shaped cross-section may, for example, provide additional structure at the base 256 that holds the monofilaments 255 for easier handling and assembly. Although the channel-like profile of this base 256 is shown in somewhat exaggerated fashion in FIG. 9, note as was mentioned above when discussing the prior art that excessive height is not preferred in the channel-like base 256 from the standpoint of lowering second moment of inertia and improving flexibility with respect to bending of the flexible strip brush element 250 in such fashion as to form an endless loop or jointless spiral therefrom. Except for the different shape of the base 256, structure and function of the flexible strip brush element 250 of the second embodiment shown in FIG. 9 being similar to the structure and function of the flexible strip brush element 150 of the first embodiment shown in FIG. 5, like parts are therefore given like-numbered reference numerals and description thereof is omitted for brevity.

Conversely, except where otherwise clear from context, description given below with reference to the flexible strip brush element 250 shown in FIGS. 9 and 10A, and with reference to the flexible belt brush 200 assembled therefrom shown in FIG. 11, may be understood to apply as well to the flexible strip brush element 150 shown in FIG. 5 and to the flexible belt brush 100 assembled therefrom shown in FIG. 6. In particular, description of the bristle attachment region 257 shown in FIGS. 9 through 11, of the side-to-side bonding region 220 shown in FIG. 11, and of the belt drive surface 230 shown in FIG. 11, although not shown or described to the same extent during description of the embodiments shown in FIGS. 5 and 6, may nonetheless be understood to apply as well to the embodiments shown in FIGS. 5 and 6.

Figure 10A:
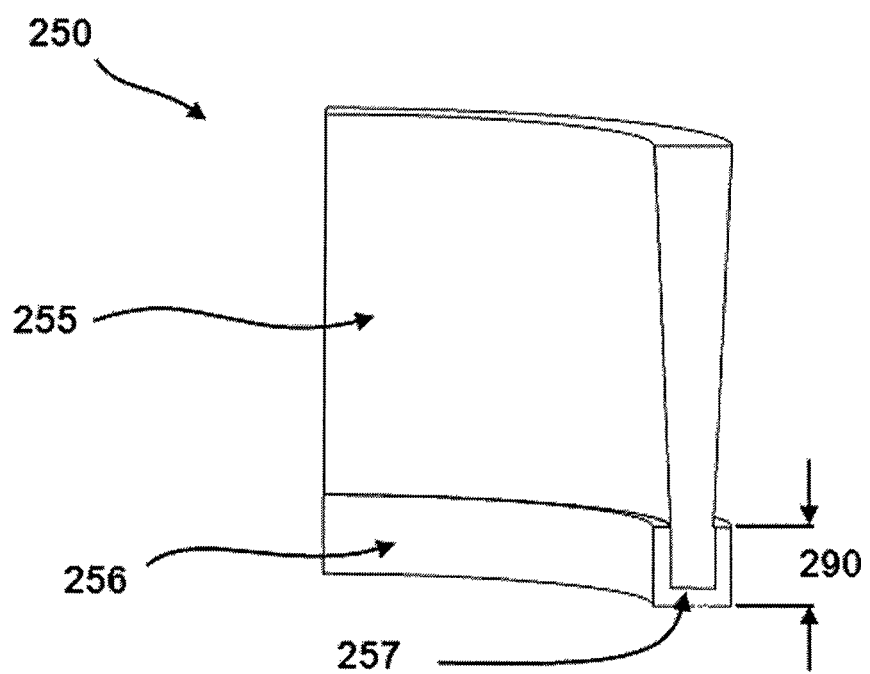
FIG. 10A is an end sectional view of the flexible strip brush element of FIG. 9.

Referring to FIG. 10A, this is an end sectional view of the flexible strip brush element 250 of the second embodiment shown in perspective view in FIG. 9. As shown by FIG. 10A, the flexible strip brush element 250 contains a multiplicity of brush bristles or monofilaments 255 arranged in substantially parallel fashion such that one end of each monofilament 255 is bonded to a flexible channel-like base 256 and the other end of each monofilament 255 is free. In some embodiments, the base 256 to which the monofilaments 255 are attached is capable of acting as a drive belt. In some embodiments, the concave side of the channel-like base 256 acts as support for the monofilaments 255 that are attached thereto, while the bottom of the channel-like base 256 serves as a drive belt capable of being driven by pulleys, idlers, or other such transport mechanism drive components. For example, in an application in which the flexible strip brush element 250 is employed as a conveyor brush, the belt side of the base 256 is driven by an appropriate transport mechanism and the free ends of the monofilaments 255 cooperate to capture or grab and carry therealong small objects including, but not limited to, nuts, bolts, pills, and/or other such objects to be conveyed. As mentioned above, especially where the flexible strip brush element 250 is to be formed into an endless loop or jointless spiral, it is preferred that channel height 290 not be too large, so as to permit good flexibility. Exemplary dimensions for the channel-like base 256 might be such that channel height 290 is on the order of between 2.5 mm and 5 mm or more, and channel width is on the order of between 2.5 mm and 6 mm or more.

Also visible at FIG. 10A is the bristle attachment region 257. The bristle attachment region 257, being the region at which the monofilaments 255 are attached to the base 256, is the location at which molten monofilament material blended with molten base material, and/or where molten base material was made to flow around and fill interstices between monofilaments, during fusion of the monofilaments 255 with the extruded base 256 (taking the case where thermoplastic resin is used as material for extrusion of the base 256, the method by which the monofilaments 255 are fused to the base 256 being substantially as described above with reference to FIG. 4). As such, at this bristle attachment region 257, there is chemical and/or physical intermingling of the monofilament material and the base material. After the molten thermoplastic material in the bristle attachment region 257 is allowed to cool following extrusion and fusion, this blending and/or intermingling of material at the interface of the monofilaments 255 and the base 256 permits the monofilaments 255 to be held firmly to the base 256 without the need for staples or other such fasteners. Moreover, because there is no need to use staples or other such fasteners, monofilaments 255 can be arranged with uniform density and without discontinuity in any desired density. Furthermore, manufacturing is greatly simplified, as there is no need to drill or mold holes, nor to insert monofilament tufts within such holes, nor to staple or otherwise fasten such monofilament tufts within such holes. Moreover, elimination of the need to staple monofilament tufts within holes makes it possible to greatly reduce the thickness in the height direction of the base 256, and notwithstanding that the channel height 290 is shown in somewhat exaggerated fashion in FIG. 10A there is no particular objection to reducing channel height 290 so that the base 256 of the second embodiment shown in FIG. 10A approaches a configuration resembling that of the first configuration shown in FIG. 5. For example in an embodiment in which the flexible strip brush element 250 is to be used as a conveyor brush, the base 256 need be only as thick as is required for the drive belt surface at the bottom and the bristle attachment region 257 at the top. Such a flexible strip brush element 250 will exhibit good flexibility with respect to flexure about an axis perpendicular to the plane of the bristles 255, such as would be desired were the flexible strip brush element 250 to be fashioned in an endless loop or jointless spiral for driving by pulleys and idlers.

As was the case with the flexible strip brush element 150 shown in FIG. 5, the flexible strip brush element 250 shown in FIGS. 9 and 10A may employed as a flexible belt brush 200 in the form of a linear section or may be fashioned into an endless loop or jointless spiral. If fashioned in the form of a linear section, this might be applied about the circumference of a shuttle canister that opens in clamshell fashion, leaving a gap to permit the canister to open, if used to slidably seal gaps between canister and tube in a pneumatic tube transport system, or might be made to engage in reciprocating motion by the mechanical components of a suitable transport mechanism if used as a conveyor brush or cleaning brush, for example. If fashioned in the form of an endless loop or jointless spiral, this might be fitted over the end of an end-opening shuttle canister if used to slidably seal gaps between canister and tube in a pneumatic tube transport system, or might be employed as a flexible belt brush capable of being driven about pulleys and idlers. Furthermore, a plurality of flexible strip brush elements 250 as shown in FIGS. 9 and 10A may be combined in side-by-side fashion to form a flexible belt brush 200 of any desired width.

Figure 10B:
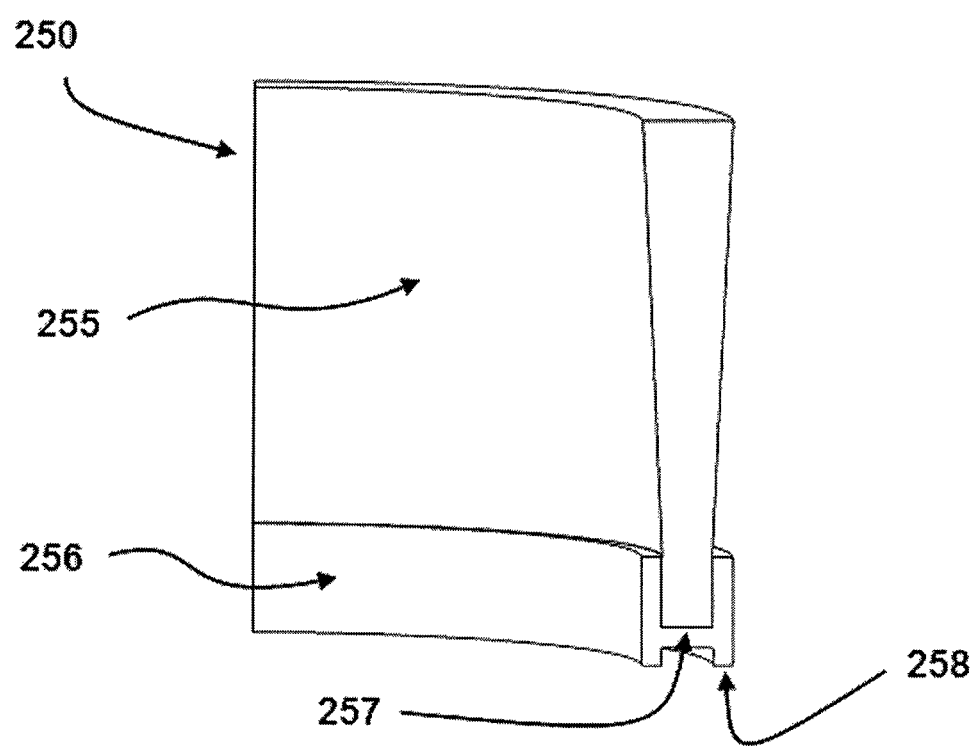
FIG. 10B is an end sectional view of an embodiment of the flexible strip brush element of FIG. 9 with ribs on the bottom side.

FIG. 10B illustrates an alternative embodiment of an end sectional view of the flexible strip brush element 250 of the second embodiment shown in perspective view in FIG. 9. As shown in FIG. 10B, the base 256 is extended along the sides of the brush element 250 both above and below the plane of the proximal ends of the bristles 255. The extension below the plane of the proximal ends of the bristles 255 forms a rib 258.

The manufacturing method used to fabricate the flexible strip brush element 250 of the alternative embodiment shown in FIG. 10B is similar to the manufacturing method used to fabricate the flexible strip brush element 150 of the first embodiment shown in FIG. 5, except that the extrusion die employed for extrusion of the flexible strip brush element 250 of the second embodiment shown in FIG. 9 is shaped so as to cause the base 256 to have a channel-like, or H-shaped, cross-section. Employment of a base 256 having channel-like or H-shaped cross-section may, for example, provide additional structure at the base 256 that holds the monofilaments 255 for easier handling and assembly. The ribs 258 may also improve the welding process for the backside of the belt when bonding multiple strip brush elements 250 together, as described below. Exemplary dimensions for the ribs 258 might be such that rib height is up to 2 mm or more, and having a preferred rib height of approximately 0.5 mm. Except for the different shape of the base 256, structure and function of the flexible strip brush element 250 of the alternative embodiment shown in FIG. 10B being similar to the structure and function of the flexible strip brush element 150 of the first embodiment shown in FIG. 5, like parts are therefore given like-numbered reference numerals and description thereof is omitted for brevity.

It should be noted that while FIG. 10B shows ribs 258 deployed in conjunction with a channel-like base 256 where the channel height 290 (FIG. 10A) is larger than the height of the ribs 258, in other embodiments (not shown) the channel height 290 may be equal or smaller than the height of the ribs 258. In other embodiments (not shown) the ribs 258 may be present in the absence of a channel in base 256.

Figure 11:
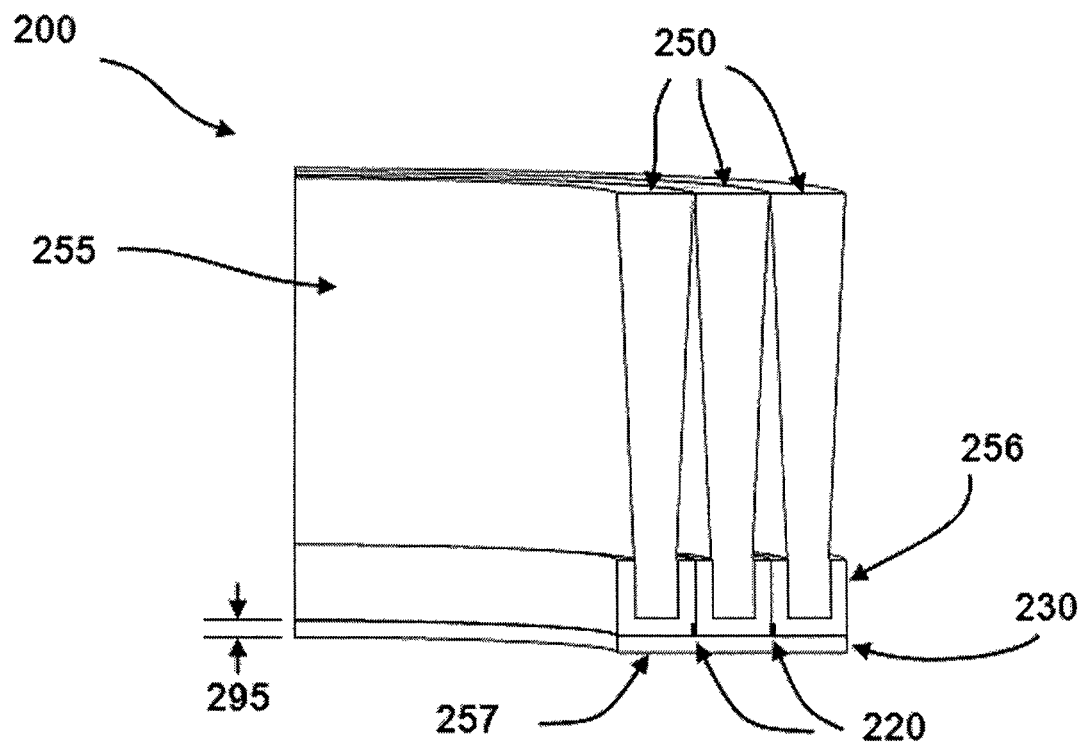
FIG. 11 is an end sectional view of a flexible belt brush manufactured from three flexible strip brush elements similar to the flexible strip brush element shown in FIGS. 9 and 10A.

FIG. 11, illustrates an end sectional view of a flexible belt brush 200 suitable for slidably sealing gaps between canister and tube in a pneumatic tube transport system or as a flexible belt brush in a conveyor or cleaning application, for example. The flexible belt brush 200 shown in FIG. 11 contains a plurality (here, three) of flexible strip brush elements 250 as described with reference to FIGS. 9 and 10A. In the embodiment shown in FIG. 11, three flexible strip brush elements 250 as shown in FIGS. 9 and 10A are bonded side-by-side by thermal bonding, glue, chemical bonding, coextrusion, lamination, or any other suitable method. In bonding the flexible strip brush elements 250 in side-by-side fashion, side bonding region(s) 220 and/or bottom bonding region(s) 230 may be employed as described below. In some embodiments, the flexible belt brush 200 so formed is such that the bottoms of the bases 256 cooperate to form a belt drive surface capable of being driven by a suitable transport mechanism. As with the flexible belt brush 100 described with reference to FIG. 6, the flexible belt brush 200 shown in FIG. 11 may take the form of a linear section or may be fashioned into an endless loop or jointless spiral. If fashioned in the form of a linear section, this might be applied about the circumference of a shuttle canister that opens in clamshell fashion, leaving a gap to permit the canister to open, if used to slidably seal gaps between canister and tube in a pneumatic tube transport system, or might be made to engage in reciprocating motion by the mechanical components of a suitable transport mechanism if used as a conveyor brush, for example. If fashioned in the form of an endless loop or jointless spiral, this might be fitted over the end of an end-opening shuttle canister if used to slidably seal gaps between canister and tube in a pneumatic tube transport system, or might be employed as a flexible belt brush capable of being driven about pulleys and idlers. Moreover, in the flexible belt brush 200 so formed, the free ends of the monofilaments 255 of the flexible strip brush elements 250 cooperate to form a bristle end zone. For example, if the flexible belt brush 200 is employed as a conveyor brush, this bristle end zone might collectively form a single conveyor drive face capable of nestling therewithin and carrying therealong small objects including, but not limited to, nuts, bolts, pills, and/or other such objects to be conveyed.

In forming the flexible belt brush 200 shown in FIG. 11 from three flexible strip brush elements 250 as shown in FIGS. 9 and 10A, adjacent flexible strip brush elements 250 may, for example, be bonded together by means of side bonding regions 220. These side bonding regions 220 may be formed using heat, glue, solvent, coextrusion, or any other suitable method. In some embodiments, presence of these side bonding regions 220 alone is sufficient to mechanically join adjacent flexible strip brush elements 250. That is, although a separate bottom bonding region 230 is shown in FIG. 11, and an example is described below in which such a separate bottom bonding region 230 is formed through coextrusion, lamination, melting and reforming, or dissolving and resolidifying, of the area through application of glue, heat, solvent, or other suitable method, in some embodiments there is no need for such a separate bottom bonding region 230. That is, where there is no need for such a separate bottom bonding region 230, this can be interpreted to mean that the thickness 295 of the bottom bonding region 230 is zero. For example, in an application in which the flexible belt brush 200 is employed as a belt brush in a conveyor or similar transport application, a thickness 295 of zero at the bottom bonding region 230 should be interpreted to mean that the bottoms of the bases 256 of the flexible strip brush elements 250 themselves cooperate to form a belt drive surface capable of being driven about pulleys and idlers. Alternatively or in addition to one or more side bonding regions 220, adjacent flexible strip brush elements 250 may be bonded together by means of a bottom bonding region 230. This bottom bonding region 230 may be formed using heat, glue, solvent, coextrusion, lamination, or any other suitable method. In some embodiments, presence of this bottom bonding region 230 alone is sufficient to mechanically join adjacent flexible strip brush elements 250. That is, although side bonding regions 220 are shown in FIG. 11, and an example is described above in which such side bonding regions 220 are formed through coextrusion, lamination, melting and reforming, dissolving and resolidifying, and/or through application of glue, heat, solvent, or other suitable method, in some embodiments there is no need for such side bonding regions 220, the presence of the bottom bonding region 230 alone being sufficient to hold the flexible strip brush elements 250 together in side-by-side fashion. Moreover, in an application in which the flexible belt brush 200 is employed as a belt brush in a conveyor or similar transport application, the bottom surface of the bottom bonding region 230 may serve as a belt drive surface capable of being driven about pulleys and idlers.

For example, where heat is employed to form a bottom bonding region 230, the zone indicated with reference numeral 230 at FIG. 11 might be a zone in which application of heat caused the bottoms of the bases 256 to melt together, this then being made to resolidify in this configuration upon cooling. In some embodiments, the side bonding regions 220 may be absent, this bottom bonding region 230 alone being sufficient to bond flexible strip brush elements 250 together in side-by-side fashion, and in some embodiments the zone indicated with reference numeral 220 at FIG. 11 might be a zone in which hot base material, this base material having melted due to application of heat in forming the bottom bonding region 230, flows into the spaces between adjacent flexible strip brush elements 250, and the side bonding regions 220 so formed are also made to resolidify in this configuration upon cooling. That is, in some embodiments in which there is substantially only a bottom bonding region 230, there is nevertheless the possibility that there may be some wicking or unintended flow of excess or residual material from the bottom bonding region into the space between channel sides, but without significant mechanical effect or contribution to bonding strength between adjacent strip brush elements 250. Furthermore, in some embodiments, reference numeral 230 at FIG. 11 might be interpreted to indicate a separate carrier strip of suitable material (e.g., flexible thermoplastic resin such as nylon or polypropylene) that is bonded to the bottoms of the bases 256 of the flexible strip brush element 250 by means of heat, glue, solvent, coextrusion, lamination, or any other suitable method to form the bottom bonding region 230.

Where the strip brush elements 250 forming the flexible belt brush 200 shown in FIG. 11 are configured as per the alternative embodiment shown in FIG. 10B where the base 256 includes ribs 258, the ribs 258 may facilitate the formation of the bottom bonding region 230 (FIG. 11). In such an alternative embodiment, heat may be applied to ribs 258, causing the material of ribs 258 to melt and flow onto the back of the brush beside ribs 258, thereby forming the bottom bonding region 230. In such an alternative embodiment, the melted rib material may entirely form the bottom bonding region 230, or the bottom bonding region 230 may be further supplemented with additional material. Such additional material may be added by melting the material so it flows and solidifies over bottom bonding region 230, or may instead be laminated over the material of melted ribs 258. When ribs 258 are heated and melted, the height of ribs 258 may be somewhat reduced, forming a smaller, residual rib, or the ribs 258 may be entirely reduced so that the ribs 258 are removed and the rib material is entirely reformed into the bottom bonding region 230.

Moreover, although in the foregoing description side bonding regions 220 were described as plural and a bottom bonding region 230 was described as singular, there is no particular objection to combining use of side bonding region(s) 220 and/or bottom bonding region(s) 230 in any desired combination. For example, in an embodiment in which a flexible belt brush is fabricated from, for example, three flexible strip brush elements, a side bonding region 220 might be used to bond one pair of adjacent strip brush elements while a bottom bonding region 230 might be used to bond the other pair of adjacent strip brush elements. As another example, in an embodiment in which a flexible belt brush is fabricated from, for example, four flexible strip brush elements, a side bonding region 220 might be used to bond the central pair of adjacent strip brush elements while bottom bonding regions 230 might respectively be used to bond the pairs of adjacent strip brush elements to either side of the central pair of adjacent strip brush elements, or vice-versa.

In the foregoing description, application of heat is employed to form side bonding region(s) 220 and/or bottom bonding region(s) 230 for holding flexible strip brush elements 250 together in side-by-side fashion to form a flexible belt brush 200 of width greater than the width of a single flexible strip brush element 250. However, glue, solvent, coextrusion, or any other suitable method may be employed to form side bonding region(s) 220 and/or bottom bonding region(s) 230 for joining flexible strip brush elements 250 in side-by-side fashion. The procedure being similar regardless of the method employed for forming side bonding region(s) 220 and/or bottom bonding region(s) 230, and description having been given in exemplary fashion for use of heat to form side bonding region(s) 220 and/or bottom bonding region(s) 230, detailed description of other methods is omitted for brevity.

Figure 12:
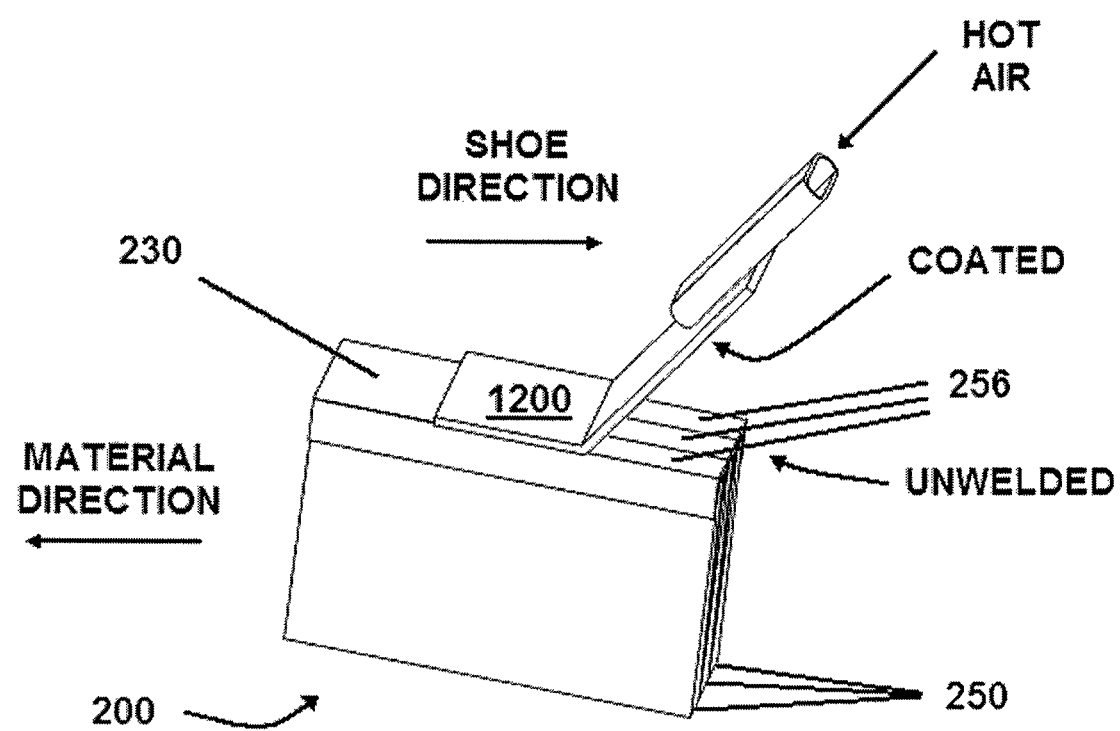
FIG. 12 is a drawing showing a method for manufacturing a flexible belt brush similar to that shown in FIG. 11 from two flexible strip brush elements similar to the flexible strip brush element shown in FIGS. 9 and 10A.

Referring to FIG. 12, this shows a method for manufacturing a flexible belt brush 200 similar to that shown in FIG. 11 from three flexible strip brush elements 250 similar to the flexible strip brush element 250 shown in FIGS. 9, 10A and 10B. In accordance with the method depicted in FIG. 12, heat is employed to reflow, or melt and resolidify, the material of the bases 256 of the strip brush elements 250 so as to form a bottom bonding region 230. During formation of the bottom bonding region 230, application of heat causes the bottoms of the bases 256 to melt together, the molten bases then being made to resolidify in a fused configuration upon cooling. In the embodiment shown, there is substantially only a bottom bonding region 230 and no side bonding region 220, except to the extent that wicking or capillary-like flow of excess or residual molten material from the bases or bottom bonding region 230 flows into the spaces between channel sides. However, in the embodiment shown, presence of such insignificant amount of material between channel sides would not be understood to qualify as a side bonding region 220 unless it were to have significant mechanical effect or contribution to bonding strength between adjacent strip brush elements 250. In FIG. 12, it should be noted that a shoe-like tool 1200 that has been coated with Teflon® (registered trademark of E.I. du Pont de Nemours and Company, of Delaware USA) or other such nonstick material (e.g., any of the substances commonly employed, for example, as mold release agent may alternatively or in addition be used) is used in combination with a hot air gun (not shown) or other suitable source of heat to reflow the base material in controlled fashion as the heated nonstick tool is pressed against the bottom surfaces of the bases with appropriate pressure while the tool 1200 is dragged therealong at a suitable relative speed as will cause reflow to an appropriate depth. At this time, use of such a nonstick tool 1200 facilitates manipulation of the otherwise unwieldy molten material, since the flexible materials preferably employed as base material tend to become quite soft and gooey when heated.

Where the strip brush elements 250 being bonded are of the alternative embodiment shown in FIG. 10B where the base 256 includes ribs 258, the ribs 258 may further facilitate and strengthen the formation of the bottom bonding region 230. When two or more brush elements 250 are placed side by side, the shoe-like tool 1200 of FIG. 12 is applied to the bottom region and the shoe-like tool will initially come in contact with ribs 258, causing the ribs 258 to melt and flow onto the back of the brush. The material from the melted ribs 258 is added to the back of the brush, thereby forming the bottom bonding region 230 and adding to the overall thickness of the brush and thus strengthening the belt. Further, the thin width of the ribs 258 allows the material of ribs 258 to melt and begin to flow more quickly upon application of heat from the shoe-like tool than the material of an embodiment without ribs 258, such as the embodiment shown in FIG. 10A.

Where a strip brush element such as that shown in FIG. 5 or FIGS. 9, 10A and 10B, or a strip brush such as that shown in FIG. 6 or FIG. 11, is wrapped around a mandrel in helical fashion to form a jointless spiral, adjacent coils of the helical spiral may be bonded in side-by-side fashion in substantially the same manner as has been described above for bonding of adjacent strips. For example, side-by-side bonding may in such case be carried out through use of side bonding region(s) and/or bottom bonding region(s). As this has been described in detail in connection with bonding of adjacent strips, description in connection with bonding of adjacent coils is omitted for brevity.

FIGS. 13 through 15 show various exemplary belt brush configurations emphasizing the flexibility and versatility of the flexible belt brushes that may be manufactured in accordance with embodiments of the present invention, the flexible belt brush at FIG. 13 being shown in a configuration intended to emphasize the superior flexibility thereof with respect to flexure about an axis perpendicular to the plane of the bristles, and the flexible belt brushes at FIGS. 14 and 15 being shown in configurations intended to emphasize the superior flexibility thereof with respect to flexure as well as torsion.

A flexible belt brush containing one or more flexible strip brush elements as described above overcomes one or more inadequacies of the prior art and/or has other benefits and advantages. It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A flexible strip brush element comprising:
   a base having a top and a bottom, the base fabricated of a base material selected from the group consisting of thermoplastic resins, thermosetting resins and combinations thereof;
   a multiplicity of monofilaments, each of the monofilaments having a proximal end and a distal end, the monofilaments fabricated of a monofilament material, wherein the monofilament material is a thermoplastic resin; and
   a bristle attachment region;
   the proximal ends of the monofilaments are attached to the top of the base by way of the bristle attachment region;
   the distal ends of the monofilaments are free and collectively form a bristle end zone;
   within the bristle attachment region, there is intermingling of a material from the base and a material from the monofilaments; and
   within the bristle attachment region, the material from the base fills interstices between the monofilaments to thereby provide the plurality of monofilaments in a substantially parallel fashion,
   wherein the base has an H-shaped cross-sectional profile defining a first concave side at the top thereof, the proximal ends of the monofilaments being attached by way of the bristle attachment region to the first concave side of the base, and further defining a second concave side at the bottom of the base opposite the bristle attachment region.

2. A flexible strip brush, comprising a plurality of strip brush elements, each comprising:
   a base having a top and a bottom, the base fabricated of a base material selected from the group consisting of thermoplastic resins, thermosetting resins and combinations thereof;
   a multiplicity of monofilaments, each of the monofilaments having a proximal end and a distal end, the monofilaments fabricated of a monofilament material, wherein the monofilament material a thermoplastic resin; and
   a bristle attachment region;
   the proximal ends of the monofilaments are attached to the top of the base by way of the bristle attachment region; the distal ends of the monofilaments are free and collectively form a bristle end zone;
   within the bristle attachment region, there is intermingling of a material from the base and a material from the monofilaments;
   within the bristle attachment region, the material from the base fills interstices between the monofilaments to thereby provide the monofilaments arranged in substantially parallel fashion;
   wherein each of the plurality of strip brush elements are mutually bonded in side-by-side fashion so that the free distal ends of the monofilaments cooperate to form a common bristle end zone; and
   wherein the base has an H-shaped cross-sectional profile defining a first concave side at the top thereof, the proximal ends of the monofilaments being attached by way of the bristle attachment region to the first concave side of the base, and further defining a second concave side at the bottom of the base opposite the bristle attachment region.

3. A flexible strip brush according to claim 2, wherein the mutual bonding in side-by-side fashion is at least partially accomplished by a side bonding region.

4. A flexible strip brush according to claim 3, wherein the side bonding region utilizes one or more species selected from among the group consisting of coextrusion, lamination, glue, heat, and solvent.

5. A flexible strip brush according to claim 2, wherein the mutual bonding in side-by-side fashion is at least partially accomplished by a bottom bonding region.

6. A flexible strip brush according to claim 5, wherein the bottom bonding region utilizes one or more species selected from among the group consisting of thermal bonding, adhesive, chemical bonding, coextrusion, and lamination.

7. A flexible strip brush according to claim 5, wherein the bottom bonding region is a laminated carrier strip made of flexible thermoplastic resin.

8. A flexible strip brush according to claim 7, wherein the laminated carrier strip comprises at least one of the group comprising nylon and polypropylene.

9. A flexible belt brush element, comprising:
   a base having a first end, a second end, a top and a bottom, the base fabricated of a base material selected from the group consisting of thermoplastic resins, thermosetting resins and combinations thereof;
   a multiplicity of monofilaments, each of the monofilaments having a proximal end and a distal end, the monofilaments fabricated of a monofilament material, wherein the monofilament material a thermoplastic resin; and
   a bristle attachment region;
   the proximal ends of the monofilaments are attached to the top of the base by way of the bristle attachment region;
   the distal ends of the monofilaments are free and collectively form a bristle end zone;
   within the bristle attachment region, there is intermingling of a material from the base and a material from the monofilaments;
   within the bristle attachment region, the material from the base fills interstices between the monofilaments to thereby provide the plurality of monofilaments in a substantially parallel fashion;
   wherein the base has an H-shaped cross-sectional profile defining a first concave side at the top thereof, the proximal ends of the monofilaments being attached by way of the bristle attachment region to the first concave side of the base, and further defining second concave side the bottom of the base opposite the bristle attachment region; and
   the first end and second end of the base are joined together by means of a joint to form an endless loop.

10. A flexible belt brush element according to claim 9, wherein the base has a width, the endless loop has a circumference, and the joint is a scarf joint in which a length of the joint in a direction of the circumference of the endless loop is approximately equal to the width of the base.

11. A flexible belt brush element according to claim 9, wherein the endless loop has a circumference, and the joint is a scarf joint in which a length of the joint in a direction of the circumference of the endless loop is approximately equal to the circumference of the endless loop.

12. A flexible belt brush element according to claim 9, wherein the joint is reinforced by one or more species selected from among the group consisting of cloth, tape, plastic sheeting, and a high-strength fiber-like material.

13. A flexible belt brush element according to claim 9, wherein the joint is formed by one or more species selected from among the group consisting of thermal bonding, adhesive, and solvent welding.

14. A flexible belt brush, wherein a plurality of belt brush elements according to claim 9 are mutually bonded in side-by-side fashion so that the free distal ends of the monofilaments cooperate to form a common bristle end zone.

15. A flexible belt brush according to claim 14, wherein the mutual bonding in side-by-side fashion is at least partially accomplished by a side bonding region.

16. A flexible belt brush according to claim 14, wherein the mutual bonding in side-by-side fashion is at least partially accomplished by a bottom bonding region.

17. A flexible belt brush according to claim 14 wherein the bottoms of the bases cooperate to form a common belt drive surface.

18. A flexible belt brush according to claim 16, wherein the bottom of the bottom bonding region forms a belt drive surface.

19. A flexible belt brush element, comprising:
a base having a top and a bottom the base fabricated of a base material selected from the group consisting of thermoplastic resins, thermosetting resins and combinations thereof;
a multiplicity of monofilaments, each of the monofilaments having a proximal end and a distal end, the monofilaments fabricated of a monofilament material, wherein the monofilament material a thermoplastic resin; and
a bristle attachment region;
the proximal ends of the monofilaments are attached to the top of the base by way of the bristle attachment region;
the distal ends of the monofilaments are free and collectively form a bristle end zone;
within the bristle attachment region, there is intermingling of a material from the base and a material from the monofilaments;
within the bristle attachment region, the material from the base fills interstices between the monofilaments to thereby provide the plurality of monofilaments in a substantially parallel fashion;
wherein the base has an H-shaped cross-sectional profile defining a first concave side at the top thereof, the proximal ends of the monofilaments being attached byway of the bristle attachment region to the first concave side of the base, and further defining a second concave side at the bottom of the base opposite the bristle attachment region;
the base is wound in helical fashion, adjacent coils of the helically wound base being bonded to one another in side-by-side fashion to form a jointless spiral;
wherein the bonding of adjacent coils of the helically wound base in side-by-side fashion is at least partially accomplished by a bottom bonding region comprising a re-solidified melted surface of the base.

20. A flexible belt brush element according to claim 19, wherein the bottom bonding region utilizes one or more species selected from among the group consisting of thermal bonding, adhesive, chemical bonding, coextrusion, and lamination.

21. A flexible belt brush element according to claim 19, wherein the bottom bonding region is a laminated carrier strip made of flexible thermoplastic resin.

22. A flexible belt brush element according to claim 21, wherein the laminated carrier strip comprises at least one of the group comprising nylon and polypropylene.

23. A flexible belt brush element according to claim 19, wherein the bottom of the base in the adjacent coils forms a belt drive surface.

24. A flexible belt brush element according to claim 19, wherein the bottom of the bottom bonding region forms a belt drive surface.

25. A flexible belt brush comprising a plurality of strip brush elements, each of the strip brush elements comprising
a base having a first end, a second end, a top and a bottom the base fabricated of a base material selected from the group consisting of thermoplastic resins, thermosetting resins and combinations thereof;
a multiplicity of monofilaments, each of the monofilaments having a proximal end and a distal end, the monofilaments fabricated of a monofilament material, wherein the monofilament material a thermoplastic resin;
a bristle attachment region;
the proximal ends of the monofilaments being attached to the top of the base by way of the bristle attachment region;
the distal ends of the monofilaments being free and collectively forming a bristle end zone;
within the bristle attachment region, there being intermingling of a material from the base and a material from the monofilaments;
within the bristle attachment region, the material from the base filling interstices between the monofilaments to thereby provide the plurality of monofilaments in a substantially parallel fashion; and
the first end and the second end of the base are joined by means of a joint to form an endless loop,
wherein the base has an H-shaped cross-sectional profile defining a first concave side at the top thereof, the proximal ends of the monofilaments being attached by way of the bristle attachment region to the first concave side of the base, and further defining a second concave side at the bottom of the base opposite the bristle at region;
wherein the strip brush elements are mutually bonded in side-by-side fashion so that the free distal ends of the monofilaments cooperate to form a common bristle end zone; and
adjacent endless loops of the collective entity are bonded in side-by-side fashion.

26. A flexible belt brush according to claim 25, wherein the bonding of adjacent coils of the collective entity in side-by-side fashion is at least partially accomplished by a bottom bonding region.

27. A flexible belt brush according to claim 26, wherein the bonding of adjacent coils of the collective entity in side-by-side fashion is at least partially accomplished by a side bonding region.

28. A flexible belt brush element according to claim 26, wherein the bottoms of the bases cooperate to Rum a common belt drive surface.

29. A flexible belt brush element according to claim 26, wherein the bottom of the bottom bonding region forms a belt drive surface.

30. A shuttle-type pneumatic tube transport system employing a shuttle canister to carry objects back and forth within a pneumatic transport tube, wherein a flexible belt brush according to claim 9 slidably seals a gap between the shuttle canister and the pneumatic transport tube.

31. A conveyor brush, wherein the bristle end zone of a flexible belt brush according to claim 9 forms a conveyor drive face for transporting objects to be conveyed.

32. A cleaning brush, wherein the bristle end zone of a flexible belt brush according to claim 9 forms a cleaning brush for cleaning an object to be cleaned.

* * * * *